United States Patent
Ji et al.

(10) Patent No.: US 8,419,454 B1
(45) Date of Patent: Apr. 16, 2013

(54) CARD CONNECTOR

(75) Inventors: Mei-Li Ji, Guang-Dong (CN); Jui-Ming Chang, New Taipei (TW); Zhu-Rui Liu, Guang-Dong (CN)

(73) Assignee: Cheng UEI Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/364,342

(22) Filed: Feb. 2, 2012

(51) Int. Cl.
*H01R 13/635* (2006.01)

(52) U.S. Cl.
USPC .......................................................... 439/159

(58) Field of Classification Search .................. 439/159, 439/160, 152–155, 157, 946
See application file for complete search history.

(56) References Cited

U.S. PATENT DOCUMENTS

| | | | |
|---|---|---|---|
| 6,270,365 B1 * | 8/2001 | Nishioka | 439/159 |
| 6,319,029 B2 * | 11/2001 | Nishioka | 439/159 |
| 6,714,597 B1 * | 3/2004 | Antonio et al. | 375/296 |
| 6,776,640 B2 * | 8/2004 | Nishioka | 439/325 |
| 6,814,596 B2 * | 11/2004 | Yu et al. | 439/159 |
| 6,929,491 B1 * | 8/2005 | Chi-Te | 439/159 |
| 6,934,159 B2 * | 8/2005 | Nogami | 361/726 |
| 6,962,500 B1 * | 11/2005 | Chen | 439/159 |
| 7,033,190 B1 * | 4/2006 | Chen | 439/159 |
| 8,262,400 B1 * | 9/2012 | Qu et al. | 439/188 |
| 2002/0037658 A1 * | 3/2002 | Ozawa | 439/159 |

* cited by examiner

*Primary Examiner* — Tulsidas C Patel
*Assistant Examiner* — Phuongchi T Nguyen
(74) *Attorney, Agent, or Firm* — Cheng-Ju Chiang

(57) ABSTRACT

A card connector adapted for receiving a micro-SIM card therein includes an insulating housing, a plurality of terminals disposed in the insulating housing, a tray and a shielding shell covered on the insulating housing. The ejection mechanism includes a sliding block having a pushing body, a guide pin and an elastic element. A top of the tray defines at least one buckling groove. A top of the shielding shell defines at least one limiting tab having a buckling portion. The tray pushes the pushing body to drive the sliding block rearward or forward under a cooperation of the guide pin and the elastic element to make the buckling portion buckled in the buckling groove or apart from the buckling groove so as to lock the tray together with the micro-SIM card in the card connector or eject the tray together with the micro-SIM card out of the card connector.

10 Claims, 4 Drawing Sheets

CARD CONNECTOR

BACKGROUND OF THE INVENTION

1. Field of the Invention

The present invention generally relates to a card connector, and more particularly to a card connector capable of locking a micro-SIM card therein and ejecting the micro-SIM card out therefrom effectively.

2. The Related Art

Generally, a conventional card connector adapted for receiving a micro-SIM (micro-Subscriber Identification Module) card therein is widely used in electronic communication devices, such as cell phones. The card connector is soldered on a circuit board of the electronic communication device to communicate between the micro-SIM card and the circuit board so as to realize data identification.

The card connector includes an insulating housing, a plurality of terminals, a tray and a shielding shell. The insulating housing defines a plurality of terminal grooves vertically penetrating therethrough and extending longitudinally to pass through one end of the insulating housing. Each of the terminals has a contact portion at one end thereof and a soldering portion at the other end thereof. The terminals are disposed in the terminal grooves with the contact portions thereof being exposed to a top of the insulating housing to electrically contact with the micro-SIM card, and the soldering portions thereof projecting out of the insulating housing to be soldered on the circuit board. The shielding shell is covered on the top of the insulating housing to define an insertion space between the top of the insulating housing and the shielding shell for receiving the tray together with the micro-SIM card therein.

However, the tray together with the micro-SIM card inserted into the insertion space of the card connector is often apt to slide off from the card connector to suddenly interrupt the contact of the micro-SIM card and the contact portions of the terminals. Moreover, the above-mentioned card connector has no ejection mechanism that brings inconvenience for users to eject the tray together with the micro-SIM card out of the card connector.

SUMMARY OF THE INVENTION

An object of the present invention is to provide a card connector adapted for receiving a micro-SIM card therein includes an insulating housing, a plurality of terminals, a tray and a shielding shell. The insulating housing has a base board. Two opposite sides of the base board extend upward to form two side walls. A rear end of the base board extends upward to form a rear wall connecting between the two side walls. A receiving space is formed among the base board, the two side walls and the rear wall. The base board defines two rows of openings vertically penetrating therethrough. Each row of the openings is arranged at regular intervals along a transverse direction. The terminals are disposed in the insulating housing with contact portions thereof projecting upward into the receiving space through the corresponding openings. The ejection mechanism includes a sliding block, an elastic element and a guide pin of an inverted-U shape. The sliding block has a base body and a pushing body extending sideward from a rear of one side of the base body. The elastic element is telescopically restrained between a rear of the base body and an inner face of the rear wall to make the sliding block slidably assembled in one side of the insulating housing with the pushing body projecting into the receiving space. One end of the guide pin is fastened in a front end of the base body and the other end of the guide pin is slidably located in the one side of the insulating housing. The tray is slidably positioned in the receiving space of the insulating housing and against a front of the pushing body of the sliding block. The tray is of a rectangular frame shape with an accommodating space being formed therein. Two bottoms of two facing sidewalls of the accommodating space of the tray protrude towards each other to form two supporting boards for propping up the micro-SIM card in the accommodating space. The contact portions of the terminals pass through an interval between the supporting boards to electrically contact with the micro-SIM card. A top of the tray defines at least one buckling groove. The shielding shell is covered on the insulating housing. A top of the shielding shell defines at least one gap. A limiting tab is defined in the gap and has a flexible arm extending forward from a rear sidewall of the gap, and a buckling portion arched downward from a free end of the flexible arm. The tray push the pushing body rearward to drive the sliding block rearward or forward under a cooperation of the guide pin and the elastic element to make the buckling portion buckled in the buckling groove or apart from the buckling groove so as to lock the tray together with the micro-SIM card in the receiving space of the card connector or eject the tray together with the micro-SIM card out of the card connector.

As described above, the tray pushes the pushing body rearward to drive the sliding block rearward or forward under a cooperation of the guide pin and the elastic element to make the buckling portion buckled in the buckling groove or apart from the buckling groove so as to lock the tray together with the micro-SIM card in the receiving space of the card connector or eject the tray together with the micro-SIM card out of the card connector effectively.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
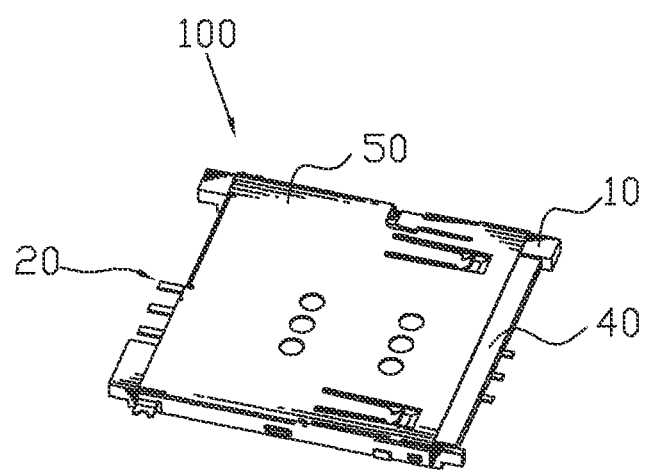
FIG. 1 is a perspective view of a card connector in accordance with the present invention, wherein a micro-SIM card is received in the card connector.
Figure 2:
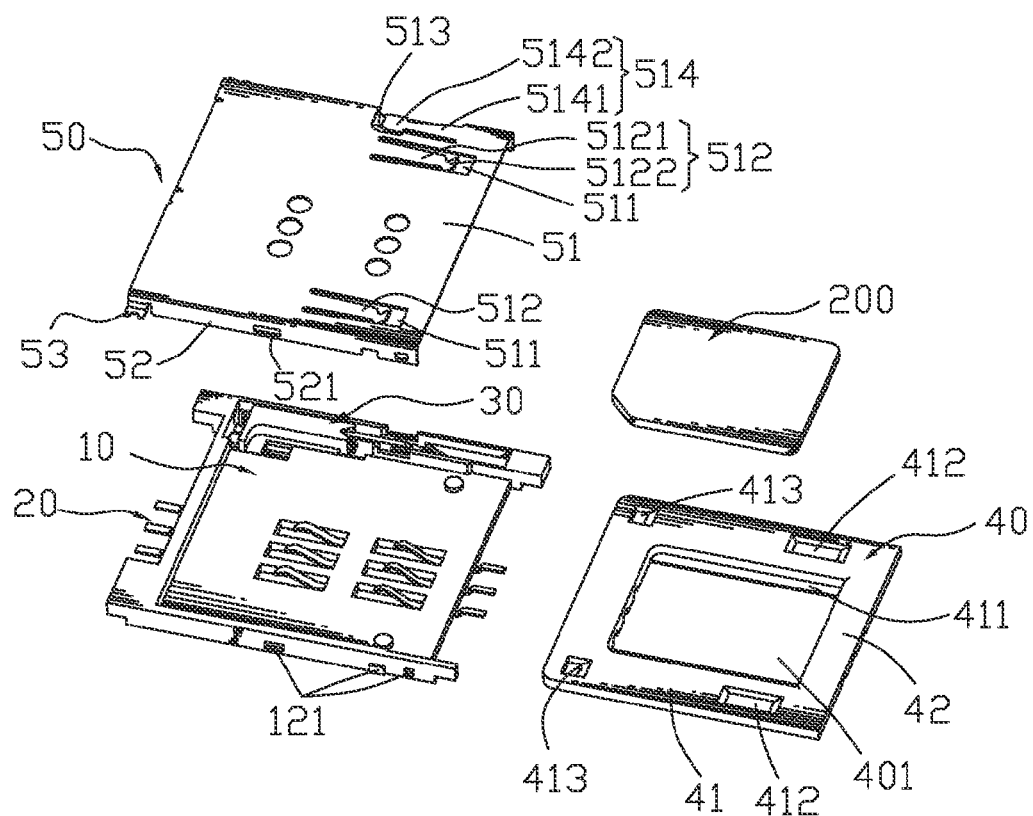
FIG. 2 is a partially exploded view of the card connector of FIG. 1, wherein the micro-SIM card is taken out of the card connector.
Figure 3:
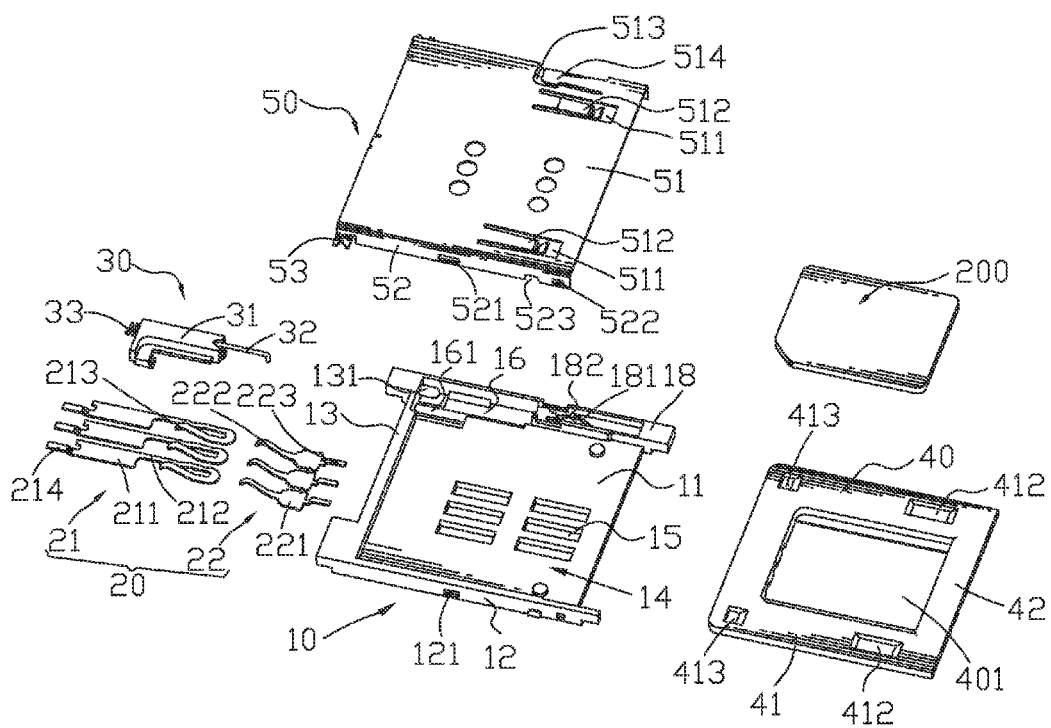
FIG. 3 is an exploded view of the card connector of FIG. 1, wherein the micro-SIM card is taken out of the card connector.
Figure 4:
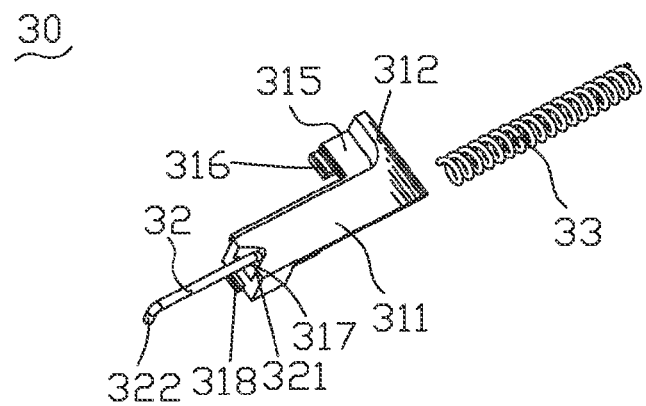
FIG. 4 is a partially exploded view of an ejection mechanism of the card connector of FIG. 3.
Figure 5:
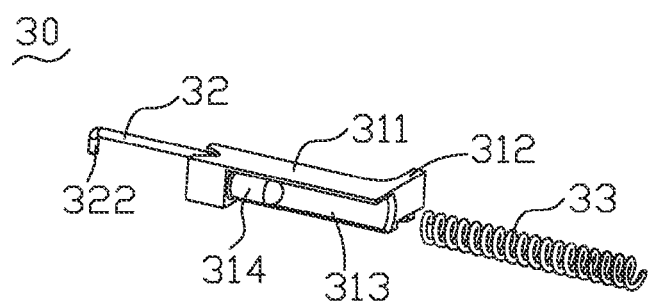
FIG. 5 is another partially exploded view of the ejection mechanism of the card connector of FIG. 3.
Figure 6:
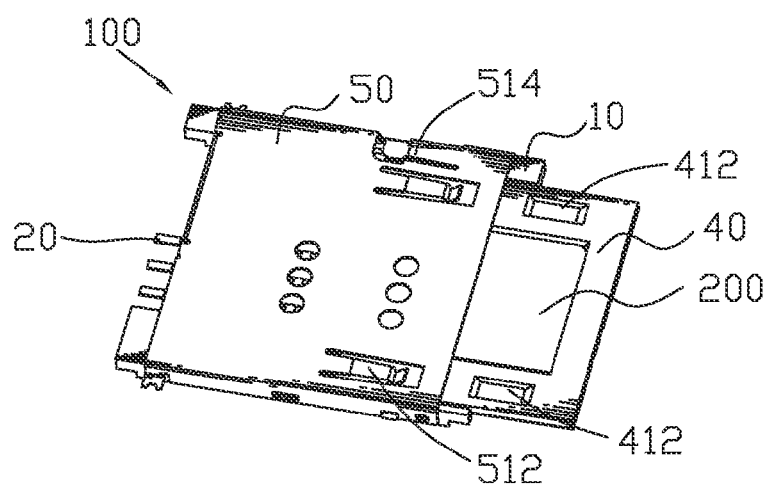
FIG. 6 is another perspective view of the card connector of FIG. 1, wherein the micro-SIM card together with a tray of the card connector is partially received in the card connector.

With reference to FIGS. 1-3, a card connector 100 in accordance with the present invention is shown. The card connector 100 adapted for receiving a micro-SIM card 200 therein includes an insulating housing 10, a plurality of terminals 20, an ejection mechanism 30, a tray 40 and a shielding shell 50.

Referring to FIGS. 2-3, the insulating housing 10 has a base board 11 of a rectangular shape. Two opposite sides of the base board 11 extend upward to form two side walls 12. A rear end of the base board 11 extends upward to form a rear wall 13 connecting between the two side walls 12. A receiving space 14 is formed among the base board 11, the two side walls 12 and the rear wall 13. The base board 11 defines two rows of rectangular openings 15 located at a front thereof and at a rear thereof, respectively. Each row of the openings 15 are arranged at regular intervals along a transverse direction. Each of the openings 15 vertically penetrates through the base board 11. One side of a top of the base board 11 defines a ladder-shaped receiving groove 16 with an inner side thereof higher than an outer side thereof. A rear of an inner side of a bottom wall of the receiving groove 16 defines a guiding groove 161. A front of the bottom wall of the receiving groove 16 protrudes upward to form a blocking block 18. A rear of the blocking block 18 defines a heart-shaped tracking groove 181 joined end to end. A blocking portion 182 is protruded upward in the tracking groove 181. A rear surface of the blocking block 18 defines a fastening groove (not shown). A first fastening pillar 131 is protruded forward from one end of an inner face of the rear wall 13 and projecting into the receiving groove 16. An outer surface of each side wall 12 defines a plurality of buckling lumps 121.

Referring to FIG. 3, the terminals 20 include a plurality of first terminals 21 and a plurality of second terminals 22. Each of the first terminals 21 has a first locating portion 211. An inverted L-shaped connecting portion 212 connects with one side of a front end of the first locating portion 211. A free end of the connecting portion 212 bends towards the first locating portion 211 and is arched upward to form a first contact portion 213 located at a same side as that of the first locating portion 211. One side of a rear end of the first locating portion 211 is inclined upward and rearward, and then extends rearward to form a first soldering portion 214. The second terminal 22 has a second locating portion 221. A middle of a rear end of the second locating portion 221 is inclined upward and rearward, and then is arched upward to form a second contact portion 222. A middle of a front end of the second locating portion 221 is inclined upward and forward, and then extends forward to form a second soldering portion 223.

Referring to FIG. 2, FIG. 3, FIG. 4 and FIG. 5, the ejection mechanism 30 includes a sliding block 31, a guide pin 32 and an elastic element 33. The sliding block 31 has a rectangular base body 311. A rear of one side of the base body 311 extends sideward to form a pushing body 312. A rear of a bottom of the base body 311 defines an arc-shaped holding groove 313 passing through the bottom of the base body 311 and the other side of the base body 311. A second fastening pillar 314 is protruded forward from a rear sidewall of the holding groove 313 and projects into the holding groove 313. A lying L-shaped propping portion 315 connects with a rear of a lower portion of the one side of the base body 311 and a lower portion of one side of the pushing body 312 adjacent to the one side of the base body 311. A bottom of the pushing body 312 protrudes downward to form a guiding block 316. A top of a front end of the base body 311 defines a fastening hole 317. A fastening block 318 protrudes forward from a front face of the front end of the base body 311. The guide pin 32 of an inverted-U shape which includes a fastening portion 321 and a sliding portion 322.

Referring to FIG. 2 and FIG. 3, the tray 40 of a rectangular frame shape with an accommodating space 401 being formed therein. The tray 40 has two parallel first planks 41, and two parallel second planks 42 connecting with the two first planks 41. Two bottoms of two facing sidewalls of the accommodating space 401 protrude towards each other to form two supporting boards 411 projecting into the accommodating space 401. Two fronts of two tops of the two first planks 41 define two buckling grooves 412. Two rears of the two tops of the two first planks 41 define two cavities 413 in alignment with the two buckling grooves 412, respectively.

Referring to FIG. 2 and FIG. 3 again, the shielding shell 50 of a semi-closed shape has a base plate 51 and two lateral plates 52 extending downward from two fronts of two opposite sides of the base plate 51. Two rears of the two opposite sides of the base plate 51 extend downward and then bend outward to form two soldering plates 53. A front of the base plate 51 defines two gaps 511 spaced from each other. A limiting tab 512 is defined in each gap 511 and has a flexible arm 5121 extending forward from a rear sidewall of the gap 511, and a buckling portion 5122 arched downward from a free end of the flexible arm 5121. One side of the front of the base plate 51 defines a mouth 513. A pressing tab 514 is defined in each mouth 513 and has an elastic arm 5141 extending rearward and inclined downward from a front edge of the mouth 513, and a pressing piece 5142 extending outward and then rearward from a free end of the elastic arm 5141. Each lateral plate 52 defines a first locating hole 521 at a substantial middle thereof, a second locating hole 522 at a front thereof, and a notch 523 located between the first locating hole 521 and the second locating hole 522, and away from the first locating hole 521.

Referring to FIGS. 1-6, in assembly, the terminals 20 are integrally molded with the insulating housing 10. The first terminals 21 are disposed in a rear of the insulating housing 10 with the first contact portions 213 projecting into the receiving space 14 from the corresponding openings 15 located at the rear of the base board 11 and the first soldering portions 214 projecting out of the insulating housing 10 through the rear wall 13. The second terminals 22 are disposed in a front of the insulating housing 10 with the second contact portions 222 projecting into the receiving space 14 from the corresponding openings 15 located at the front of the base board 11 and the second soldering portions 223 projecting out of the insulating housing 10 through a front surface of the base board 11.

The ejection mechanism 30 is slidably assembled in the insulating housing 10. The sliding block 31 is slidably disposed in the receiving groove 16 with the pushing body 312 projecting into the receiving space 14. An outer side of the receiving groove 16 is coupled with the holding groove 313 for receiving the elastic element 33 therein. One end of the elastic element 33 is worn around the second fastening pillar 314 and resists against the rear inner wall of the holding groove 313, and the other end of the elastic element 33 is worn around the first fastening pillar 131 and resists against the inner face of the rear wall 13 to make the elastic element 33 telescopically restrained between the rear inner wall of the holding groove 313 and the inner face of the rear wall 13. The fastening portion 321 is fastened to the fastening hole 317 of the sliding block 31. The sliding portion 322 is slidably located in the tracking groove 181. The guiding block 316 is slidably located in the guiding groove 161. Then the tray 40 is slidably positioned in the receiving space 14 and located at a front of the ejection mechanism 30. The shielding shell 50 is covered on the insulating housing 10 with the buckling lumps 121 being buckled in the first locating holes 521, the second locating holes 522 and the notches 523. The pressing piece 5142 of the pressing tab 514 resisting on the guide pin 32 for restraining the guide pin 32 to steadily slide in the tracking groove 181 of the sliding block 18.

Referring to FIGS. 1-6 again, in use, pull the tray 40 out to position the micro-SIM card 200 in the accommodating space 401 and the micro-SIM card 200 is propped up by the supporting boards 411 of the tray 40. When the tray 40 together with the micro-SIM card 200 is inserted into the receiving space 14 of the card connector 100, one corner of the tray 40 is located on the propping portion 315 and resists against an upper portion of the one side of the pushing body 312 adjacent to the one side of the base body 311. Then the one corner of the tray 40 pushes the pushing body 312 of the sliding block 31 rearward to drive the sliding block 31 to slide rearward in the receiving groove 16 by virtue of the guidance of the guiding block 316 in the guiding groove 161, so as to make the sliding block 31 straightly move rearward to compress the elastic element 33. The pressing piece 5142 of the pressing tab 514 resists on the guide pin 32 and exerts a horizontal force on the guide pin 32 to make the sliding portion 322 of the guide pin 32 steadily slide in the tracking groove 181 until the sliding portion 322 is locked in the blocking portion 182. Meanwhile, the guiding block 316 resists against a rear end wall of the guiding groove 161 to prevent the sliding block 31 from excessively sliding rearward in the insulating housing 10. At this moment, the tray 40 together with the micro-SIM card 200 is fully received in the receiving space 14 of the card connector 100. The buckling portions 5122 are buckled in the buckling grooves 412 to lock the tray 40 together with the micro-SIM card 200 in the receiving space 14 of the card connector 100. The first contact portions 213 and the second contact portions 222 of the terminals 20 pass through an interval between the supporting boards 411 to electrically contact with the micro-SIM card 200, and the first soldering portions 214 and the second soldering portions 223 of the terminals 20 are soldered on a circuit board (not shown) to realize an electrical connection between the micro-SIM card 200 and the circuit board.

When the micro-SIM card 200 is to be ejected out of the card connector 100, push the tray 40 rearward again to make the sliding portion 322 of guide pin 32 to re-slip into the tracking groove 181. Then the elastic element 33 is released to push the pushing body 312 forward and drive the sliding block 31 to slide forward under the guidance of the guiding block 316 and the guiding groove 161, so as to eject the tray 40 outward by virtue of the sliding block 31 until the buckling portions 5122 are apart from the buckling grooves 412. At this moment, the fastening block 318 is fastened to the fastening groove. Then pull the tray 40 forward, when the tray 40 is overly pulled out of the receiving space 14, the buckling portions 5122 are buckled in the cavities 413 of the tray 40 for preventing the tray 40 from falling off the card connector 100. So, the tray 40 together with the micro-SIM card 200 is ejected out of the card connector 100 effectively.

As described above, the tray 40 pushes the pushing body 312 rearward to drive the sliding block 31 rearward or forward under a cooperation of the guide pin 32 and the elastic element 33 to make the buckling portions 5122 buckled in the buckling grooves 412 or apart from the buckling grooves 412 so as to lock the tray 40 together with the micro-SIM card 200 in the receiving space 14 of the card connector 100 or eject the tray 40 together with the micro-SIM card 200 out of the card connector 100 effectively. Furthermore, the buckling portions 5122 are buckled in the cavities 413 of the tray 40 for preventing the tray 40 from falling off the card connector 100, when the tray 40 is overly pulled out of the receiving space 14 of the card connector 100.

What is claimed is:

1. A card connector adapted for receiving a micro-SIM (micro-Subscriber Identification Module) card therein, comprising:
    an insulating housing having a base board, two opposite sides of the base board extending upward to form two side walls, a rear end of the base board extending upward to form a rear wall connecting between the two side walls, a receiving space being formed among the base board, the two side walls and the rear wall, the base board defining two rows of openings vertically penetrating therethrough, each row of the openings being arranged at regular intervals along a transverse direction;
    a plurality of terminals disposed in the insulating housing with contact portions thereof projecting upward into the receiving space through the corresponding openings;
    an ejection mechanism including a sliding block, an elastic element and a guide pin of an inverted-U shape, the sliding block having a base body and a pushing body extending sideward from a rear of one side of the base body, the elastic element being telescopically restrained between a rear of the base body and an inner face of the rear wall to make the sliding block slidably assembled in one side of the insulating housing with the pushing body projecting into the receiving space, one end of the guide pin being fastened in a front end of the base body and the other end of the guide pin being slidably located in the one side of the insulating housing;
    a tray slidably positioned in the receiving space of the insulating housing and against a front of the pushing body of the sliding block, the tray being of a rectangular frame shape with an accommodating space being formed therein, two bottoms of two facing sidewalls of the accommodating space protruding towards each other to form two supporting boards for propping up the micro-SIM card in the accommodating space, the contact portions of the terminals passing through an interval between the supporting boards to electrically contact with the micro-SIM card, a top of the tray defining at least one buckling groove; and
    a shielding shell covered on the insulating housing, a top of the shielding shell defining at least one gap, a limiting tab being defined in the gap and having a flexible arm extending forward from a rear sidewall of the gap, and a buckling portion arched downward from a free end of the flexible arm;
    wherein the tray pushes the pushing body rearward to drive the sliding block rearward or forward under a cooperation of the guide pin and the elastic element to make the buckling portion buckled in the buckling groove or apart from the buckling groove so as to lock the tray together with the micro-SIM card in the receiving space of the card connector or eject the tray together with the micro-SIM card out of the card connector.

2. The card connector as claimed in claim 1, wherein one side of a front of the top of the shielding shell defines a mouth, a pressing tab is defined in each mouth and has an elastic arm extending rearward and inclined downward from a front edge of the mouth, and a pressing piece extending outward and then rearward from a free end of the elastic arm, the pressing piece of the pressing tab resists on the guide pin.

3. The card connector as claimed in claim 1, wherein a first fastening pillar is protruded forward from an inner face of the rear wall, a rear of a bottom of the base body defines an arc-shaped holding groove, a second fastening pillar is protruded forward from a rear sidewall of the holding groove, one end of the elastic element is worn around the second fastening pillar and resists against the rear inner wall of the holding groove, and the other end of the elastic element is worn around the first fastening pillar and resists against the inner face of the rear wall to make the elastic element telescopically restrained between the rear inner wall of the holding groove and the inner face of the rear wall.

4. The card connector as claimed in claim 1, wherein the tray has two parallel first planks, two fronts of two tops of the two first planks define two buckling grooves, two fronts of the top of the shielding shell define two gaps, the limiting tab is defined in each gap to be buckled in the buckling groove.

5. The card connector as claimed in claim 4, wherein two rears of the two first planks define two cavities in alignment with the two buckling grooves, respectively for buckling the buckling portions when the tray is overly pulled out of the receiving space.

6. The card connector as claimed in claim 1, wherein one side of a top of the base board defines a receiving groove for receiving the sliding block therein.

7. The card connector as claimed in claim 6, wherein an inner side of a bottom wall of the receiving groove defines a guiding groove, a bottom of the pushing body protrudes downward to form a guiding block slidably located in the guiding groove.

8. The card connector as claimed in claim 6, wherein a front of a bottom wall of the receiving groove protrudes upward to form a blocking block, a rear of the blocking block defines a heart-shaped tracking groove joined end to end, the guide pin has a fastening portion fastened in the front end of the base body and a sliding portion slidably located in the tracking groove.

9. The card connector as claimed in claim 8, wherein a blocking portion is protruded upward in the tracking groove for blocking the sliding portion when the tray together with the micro-SIM card is fully inserted into the receiving space.

10. The card connector as claimed in claim 8, wherein a fastening block protrudes forward from the front end of the base body, a rear surface of the blocking block defines a fastening groove for fastening the fastening block when the buckling portion is apart from the buckling groove.

* * * * *